(12) United States Patent
Cannon et al.

(10) Patent No.: US 7,572,380 B2
(45) Date of Patent: Aug. 11, 2009

(54) METHOD FOR OXYANION REMOVAL FROM GROUND WATER

(75) Inventors: Fred S. Cannon, State College, PA (US); Weifang Chen, State College, PA (US); Robert Parette, Throop, PA (US); Brian A. Dempsey, State College, PA (US); Fenglong Sun, State College, PA (US); Jiying Zou, State College, PA (US)

(73) Assignee: The Penn State Research Foundation, University Park, PA (US)

(*) Notice: Subject to any disclaimer, the term of this patent is extended or adjusted under 35 U.S.C. 154(b) by 539 days.

(21) Appl. No.: 11/257,727

(22) Filed: Oct. 25, 2005

(65) Prior Publication Data

US 2006/0102562 A1    May 18, 2006

Related U.S. Application Data

(63) Continuation-in-part of application No. 11/059,733, filed on Feb. 17, 2005, now Pat. No. 7,157,006, which is a continuation of application No. 10/164,843, filed on Jun. 7, 2002, now Pat. No. 6,881,348.

(60) Provisional application No. 60/690,065, filed on Jun. 13, 2005, provisional application No. 60/621,993, filed on Oct. 25, 2004, provisional application No. 60/296,862, filed on Jun. 8, 2001.

(51) Int. Cl.
    *C02F 1/42* (2006.01)
(52) U.S. Cl. ............... 210/681; 210/683; 210/688; 502/416
(58) Field of Classification Search ............ 210/681, 210/683, 688; 502/416
    See application file for complete search history.

(56) References Cited

U.S. PATENT DOCUMENTS

| | | | | |
|---|---|---|---|---|
| 4,427,630 | A | * | 1/1984 | Aibe et al. ............ 422/4 |
| 5,231,063 | A | * | 7/1993 | Fukumoto et al. ........ 502/62 |
| 5,521,008 | A | | 5/1996 | Lieberman et al. ...... 428/367 |
| 5,705,269 | A | | 1/1998 | Pimenov et al. ........ 428/375 |
| 6,171,372 | B1 | * | 1/2001 | Ichiki et al. ............ 95/129 |
| 6,214,607 | B1 | | 4/2001 | Logan .................. 435/262.5 |
| 6,699,393 | B2 | | 3/2004 | Baker et al. ........... 210/670 |
| 6,881,348 | B2 | | 4/2005 | Cannon et al. ......... 210/681 |

FOREIGN PATENT DOCUMENTS

JP    11207365 A  *  8/1999

OTHER PUBLICATIONS

PCT International Search Report dated Aug. 8, 2006 in regards to PCT Application No. PCT/US05/38622 filed Oct. 25, 2005.
International Search Report dated Sep. 5, 2002 for PCT/US02/18239 filed Jun. 7, 2002.
Bauer et al., "Adsorption Of Poly(Diallyl-Kimethyl-Ammoniumchloride) Pdadmac And Of Copolymers Of Dadmac With N-Methyl-N-Vinyl-Acetamide (Nmva) Ib Cikkiudak Silica"*Prog. Colloid Polym. Sci* (1998) vol. 109, pp. 161-169.
Brown et al.,"Antibiotic And Biotic Perchlorate Removal In An Activated Carbon Filter" *Journal AWWA* (2002) 94(2), pp. 70-79.
Gonce et al., "Removal Of Chlorite And Chlorate Ions From Water Using Granular Activated Carbon" *Water Research.* vol. 28, No. 5, pp. 1059-1069, Mar. 1993.
Gu et al., Regeneration Of Perchlorate (Cio4-)-Loaded Anion Exchange Resins By A Novel Tetrachloroferrate (Fec14-)Displacement Technique' *Envir. Sci.& Tech.*, vol. Xx, No. Xx, Xxxx, Feb. 2001.
Gu et al., "Preparation and Evaluation of GAC-Based Iron-Containing Adsorbents for Arsenic Removal" *Envir. Sci.& Technol.* 2005, vol. 39, pp. 3833-3843.
Gullick, "Occurrence Of Perchlorate In Drinking Water Sources" *Journal AWWA*, Jan. 2001,pp. 66-77.
Mangun et al., "Surface Chemistry, Pore Sizes, And Adsorption Properties Of Activated Carbon Fibers And Precursors Treated With Ammonia" *Carbon*, vol. 39 (2001) pp. 1809-1820.
Mendez et al., "On The Modification And Characterization Of Chemical Surface Properties Of Activated Carbon: In The Search Of Carbons With Stable Basic Properties" *Langmuir* 1996, vol. 12,pp. 4404-4410.
Na et al., "Perchlorate Removal Via Iron-Preloaded Gac And Borohydride Regeneration" *Journal AWWA*, Nov. 2002, vol. 94: 11, pp. 90-101.
Park et al., "Influence of Anodic Surface Treatment Of Activated Carbon On Adsorption And Ion Exchange Properties" *J. Colloid And Interface Sci.* (1999)vol. 218, pp. 331-334.
Reed et al., "As(III), As(V), Hg and Pb Removal by Fe-Oxide Impregnated Activated Carbon"*Journal Envir. Eng.* Sep. 2000, pp. 869-873.
Vaughan Jr. et al., "Modeling As(V) removal by a iron oxide impregnated activated carbon using the surface complexation approach" El Sevier *Water Research* 39, 2005, pp. 1005-1014.

* cited by examiner

*Primary Examiner*—Robert A Hopkins
(74) *Attorney, Agent, or Firm*—Ohlandt, Greeley, Ruggiero & Perle, L.L.P.

(57) ABSTRACT

A carbonaceous material that has been loaded with at least one ionic organic species or hydroxide species and at least one metal or alkaline earth metal. The ionic organic species or hydroxide species is at least one selected from the group consisting of: fatty acids, surfactants, organic carboxyl species, organic sulfonate species, organic hydroxyl species, organic phenolic species, organic lactone species, organic amine species, or hydroxide species.

11 Claims, 11 Drawing Sheets

METHOD FOR OXYANION REMOVAL FROM GROUND WATER

CROSS-REFERENCE TO RELATED PATENTS

This application is a Continuation-In-Part of and claims priority from U.S. application Ser. No. 11/059,733, Filed Feb. 17, 2005, now U.S. Pat. No. 7,157,006 which is a Continuation of and claims priority from U.S. application Ser. No. 10/164,843, Filed Jun. 7, 2002 now U.S. Pat. No. 6,881,348, which claims priority from U.S. Provisional Patent Application Ser. No. 60/296,862, Filed Jun. 8, 2001. This application also claims priority from U.S. Provisional Patent Application Ser. No. 60/690,065, Filed Jun. 13, 2005 and U.S. Provisional Patent Application Ser. No. 60/621,993, Filed Oct. 25, 2004. The contents of all of the preceeding applications are incorporated herein by reference as fully set forth herein for all purposes.

STATEMENT REGARDING FEDERALLY SPONSORED RESEARCH AND DEVELOPMENT

This invention was made with government support under Grant No. 0523196, awarded by The National Science Foundation. The Government has certain rights in the invention.

BACKGROUND OF THE INVENTION

1. Field of the Invention

The present invention relates generally to the a novel activated carbon that is preloaded with at least one ionic organic species and at least one metal or alkaline earth metal, such as a surfactant-iron, and the method of removing an oxyanion, such as arsenic or perchlorate, from a fluid or ground-water.

2. Description of the Related Art

During our studies on Innovative Arsenic Removal, Penn State bench-scale studies exhibited that we could efficiently and cost-effectively remove arsenic from ground water by employing a dual-vessel treatment system. The first vessel could be filled with solubilizable iron filings and the second with activated carbon that is tailored with organic-iron complexes. With such a bench dual system, we removed arsenic to below 10 ppb for 150,000 bed volumes when the influent contained 50 ppb arsenic. This system will be well-suited for small communities that aim to avoid the operational complications of conventional coagulation and filtration operations, while also avoiding the friable nature and lower sorption capacities (per unit iron) of granular iron media.

The Penn State team preloaded iron-organic carboxyl complexes onto highly porous activated carbons so as to enhance arsenic removal. We have preceded this with metallic iron filings that will be solubilized with oxygen, induced electrochemistry, and/or pH 6 water. This solubilized iron has provided a continuously fresh iron source for complexing arsenic and these complexes have been sorbed and precipitated into the tailored activated carbon.

The best results occured when ferric chloride was complexed and co-adsorbed with either citric acid, EDTA, or fatty acid. Also, favorable results occurred when the activated carbon was pre-oxidized with nitric acid, hydrochloric acid, and/or sulfuric acid, to create a considerably higher surface charge that the iron could sorb onto. It may help to include a co-complexing metal such as manganese. The competitive arsenic adsorption capacity has been tested via rapid small scale column tests (RSSCT's) for a variety of water quality conditions.

The authors anticipate that this approach will achieve cost effective and simple operations because of its several inherent advantages: (a) activated carbon systems are durable, rigid, robust, and simple to operate; whereas granular iron systems can crumble and plug. (b) iron, citrate, EDTA (ethylene diamine tetraacetic acid), fatty acids, and activated carbon are all inexpensive and non-toxic materials; (c) activated carbon hosts more surface area and pore volume per bed volume than do inorganic media. (d) The solubilizable iron bed will supply a continuously fresh source of iron to capture arsenic; and it appears that this iron more efficiently captures arsenic than does $FeCl_3$ coagulation. We solubilized iron by corroding galvanized iron fittings; and this continuously fresh supply of Fe complexed arsenic from the passing water stream, and then the Fe—As hydroxide species sorbed and/or precipitated into the GAC media. Other sources of metal iron could be used; as could other metals or alkaline earth metals. The tailored GAC served to scavenge residual dissolved arsenic. The varying valence states that the carbon, iron, and sulfur in GAC can occur at helped to capture the arsenic and the arsenic-iron complexes.

Perchlorate appears in the groundwater that 10-20 million Americans could drink; and perchlorate might adversely affect people's thyroid gland. The present inventors have uniquely discovered how to both remove perchlorates and other undesirable anions, such as nitrates, chromates, arsenates, and arsenites, and make them available ultimately for destruction by thermally pretreating or chemically preloading granular activated carbons (GACs) prior to use. The present inventors have uniquely discovered that the process of the present invention is capable of removing perchlorates, arsenic, and other anions by a combination of removal and chemical/thermal regeneration with chemicals that are commercially available in large and inexpensive quantities and which are environmentally acceptable; and which are not known to pose health risks.

As an alternative to tailored activated carbon, Granular ferric hydroxide (GFH) is a commonly used adsorbent for arsenic removal, but these iron oxide granules can crumble and disintegrate when they experience prolonged use, whereas granular activated carbon does not crumble. Also, after backwashing, there would be significant amount of headloss pressure built up in the GFH system. Although others have loaded iron hydroxide precipitates onto activated carbon, the effectiveness of this iron was minimized because the iron was not distributed within the porous carbon, and thus the higher pounds of iron per pound of As removed was required. The inventors herein have circumvented this limitation by complexing the iron with carboxyl species. This is achieved either by complexing iron with organic carboxyl species in the water phase, and then sorbing these complexes into activated carbon, or by preconditioning the activated carbon to contain many solid carbon carboxyl species within the GAC's pores, and then sorbing iron into these pores where the solid carbon carboxyl species reside.

Arsenic causes skin cancer at low concentrations. Arsenic exceeds 10 ppb (the new arsenic standard by EPA) in at least 4000 wells that appear in more than 45 U.S. states. Many of these wells service small community water systems.

The most prevalent species of arsenic in groundwater are arsenate (+V valence) and arsenite (+III valence). The arsenate prevails in oxidized or anoxic waters, while the arsenite prevails in reduced waters that also contain hydrogen sulfide. When the water pH is between 6.75 and 11.6, the $HAsO_4^=$ species will prevail in oxidized waters.

Iron, citric acid, EDTA, and fatty acids are non-toxic and commonplace in water and foods. No primary drinking water standards exist for any of these species.

The large surface area, high pore volume, and rigid structure of GAC renders it an ideal backbone for hosting a considerable quantity of iron-organic carboxyl complexes (or similar metal-organic complexes) that can be dispersed where they are available for oxyanion sorption.

Intriguingly, our Penn State system of solubilized iron and iron-organic tailored GAC has performed considerably better than any other media that the authors herein are aware of. The solubilized iron-tailored GAC system has required only 10-20 pounds of iron to remove a pound of arsenic. This stands considerably better than the 300-4000 lb Fe/lb As that the granular iron media have offered.

SUMMARY OF THE INVENTION

An object of the present invention is to devise a new, cost-effective, and innovative treatment technology for removing oxyanions such as perchlorate and arsenic from drinking water down to 4-10 ppb or less. Provide a durable approach that incurs low capital, operating, and energy costs; while requiring only simple operations, and minimal monitoring.

Another object is to develop the most favorable means of preloading GAC with surfactant-iron complexes, so as to greatly extend their arsenic adsorption capacity and bed life.

In still yet another object, the present invention aims to avoid the abrasion losses and non-durability of conventional granular iron or coated activated alumina processes by adsorbing iron within an activated carbon structure that is rigid and robust.

Further objects, features and advantages of the present invention will be understood by reference to the following drawings and detailed description.

Accordingly, the present invention provides a carbonaceous material that has been loaded or preconditioned with at least one ionic organic species and at least one metal or alkaline earth metal or halide.

The present invention also provides a method for diffusing electromagnetic energy comprising passing said electromagnetic energy over a carbonaceous material that has been loaded or preconditioned with at least one ionic organic species and at least one metal or alkaline earth metal or halide.

The present invention further provides a method for removing at least one oxyanion from a fluid comprising passing said fluid over a carbonaceous material that has been loaded or preconditioned with at least one ionic organic species and at least one metal or alkaline earth metal.

The present invention still further provides a carbonaceous material that has been loaded or preconditioned with at least one ionic organic species or hydroxide species and at least one metal or alkaline earth metal.

The present invention also provides a method for diffusing electromagnetic energy comprising passing said electromagnetic energy over a carbonaceous material that has been loaded or preconditioned with at least one ionic organic species and at least one metal or alkaline earth metal or halide.

The present invention further provides a method for removing at least one oxyanion from a fluid comprising passing said fluid over a carbonaceous material that has been loaded or preconditioned with at least one ionic organic species or hydroxide species and at least one metal or alkaline earth metal or halide.

The present invention further provides a method of removing at least one oxyanion from a fluid comprising passing said fluid through a metal media that dissolves as the fluid passes over it, releasing positive-valent metal species into the fluid, provided that the positive-valent metal species reacts with an oxyanion to form a combined species.

The present invention still further provides methods of:

(1) removing perchlorate from a fluid comprising: passing said fluid over an activated carbon material selected from the group consisting of: bituminous carbon and lignite carbon that has been loaded with an organic cationic monomer having thereon functional groups wherein said functional groups include at least one selected from the group consisting of: quaternary ammonia, amines, imines, amides, imides, pyrrolic nitrogen, and pyridinic nitrogen; wherein said cationic monomer is selected from the group consisting of: cetylpyridinium chloride (CPC) or bromide (CPB), vinylbenzyltrimethylammonium chloride or bromide and choline chloride or bromide;

(2) removing anionic contaminants from a fluid comprising: passing said fluid over a functionalized activated carbon material; and regenerating said functionalized activated carbon material via thermal treatment, wherein said functionalized activated carbon material has a bed volume life of at least about 10% of initially treated functionalized activated carbon material; wherein said activated carbon material is functionalized by loading with cetylpyridinium chloride (CPC) or bromide (CPB), vinylbenzyltrimethylammonium chloride or bromide and choline chloride or bromide;

(3) removing perchlorate from a fluid comprising: passing said fluid over an activated carbon material that has been loaded with cetylpyridinium chloride (CPC) or bromide (CPB), vinylbenzyltrimethylammonium chloride or bromide and choline chloride or bromide; and (4) removing perchlorate from a fluid comprising: passing said fluid over an activated carbon material that has been loaded with vinylbenzyltrimethylammonium chloride or bromide; and irradiating with gamma radiation to induced said vinylbenzyltrimethylammonium chloride or bromide to polymerize within the pores of said activated carbon.

The present invention also provides a functionalized activated carbon material which exhibits a positive surface charge greater than about 0.09 milliequivalents/gram, as measured in accordance with the Surface Charge Titration Protocol at a pH of 7.5, provided that it also exhibits a BET surface area greater than 850 $m^2/g$ as measured in accordance with the BET Surface Area protocol; wherein said functionalized activated carbon material is functionalized by loading with cetylpyridinium chloride (CPC) or bromide (CPB), vinylbenzyltrimethylammonium chloride or bromide and choline chloride or bromide.

The present invention uses activated carbon that is derived from parent materials that include bituminous coal, lignite coal, anthracite coal, wood, coconut shells, lignocellulosic material, peat, carbonaceous textiles, chemical vapor deposits, preformed plastics, preformed polymeric resins, and carbon aerosols.

The present invention also provides many additional advantages, which shall become apparent as described below.

DETAILED DESCRIPTION OF THE PREFERRED EMBODIMENT

Figure 1:
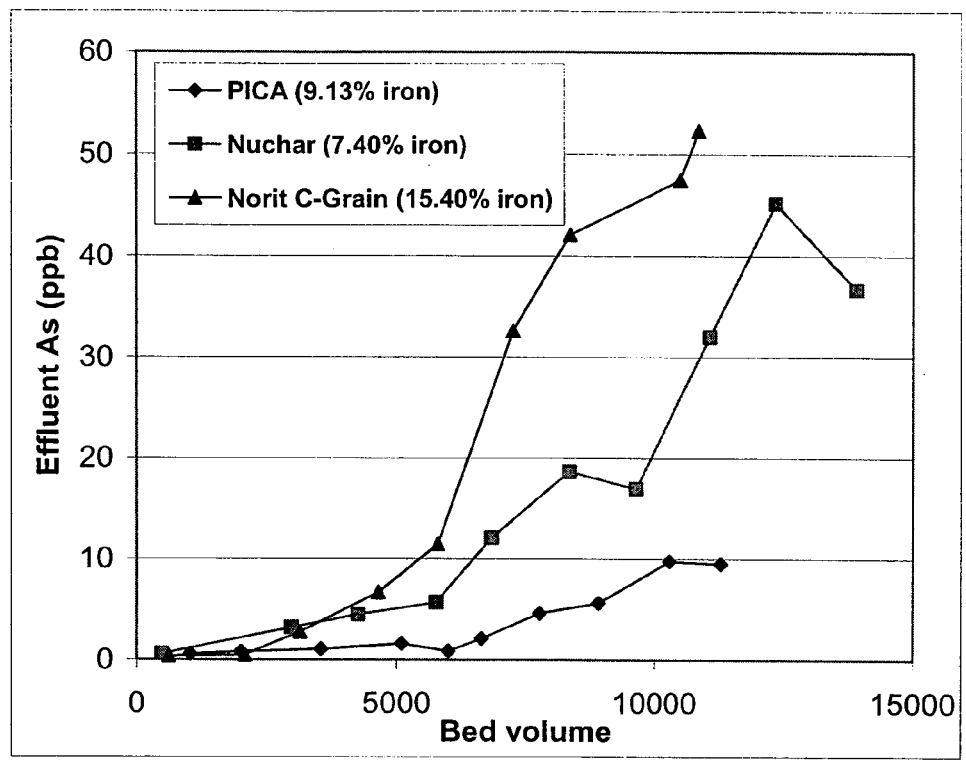
FIG. 1 shows rapid small-scale column tests (RSSCT) for arsenic with oxidized and iron-loaded wood-based carbons.

The present invention relates to a unique process for removing perchlorate, arsenic and/or other anions from water with activated carbon that has been tailored with metal salt and/or organic complex preloading and/or thermal pretreatment.

In the preloading step according to the present invention, the organic cation polymers and cationic monomers were dissolved in an aqueous solution and recirculated through a bed of activated carbon for a given time period. The cations can also be loaded via a batch process. Background ionic strength and pH can be adjusted to optimize loading conditions. The pre-loading of these materials onto the activated carbon was at ambient temperature and pressure.

Slurry pH represented the pH of a 10% slurry of the GAC. Surface charge distribution was appraised by a DL53 Metler Toledo automatic titrator, by first elevating a sample pH to 10-10.5, and then dosing in incremental amounts of acid, as described below.

Organic Cation Preloading has also dramatically enhanced perchlorate removal to below 4 ppb. The functional group is at least one selected from: quaternary ammonia, amines, imines, amides, imides, pyrrolic nitrogen, or pyridinic nitrogen.

The cationic monomer is at least one selected from: octyltrimethyl-ammonium bromide or chloride, decyltrimethylammonium bromide or chloride, dodecyltrimethylammonium bromide or chloride, tetradecyltrimethylammonium bromide or chloride, tributylheptylammonium bromide or chloride, cetylpyridinium chloride (CPC) or bromide (CPB), ammonium bromide or chloride, diallyldimethlammonium bromide or chloride, acrylamide, domiphen bromide or chloride, tetradecylammonium bromide or chloride, (4-nitrobenzyl)trimethylammonium bromide or chloride, arvinylbenzyltrimethylammonium bromide or chloride, benzoylcholine bromide or chloride, acetylthiochloine iodide, methacholine bromide or chloride, betaine hydro bromide or chloride, betaine, chlorocholine bromide or chloride, choline chloride or bromide, decamethonium bromide or chloride, hexamethonium bromide or chloride, ferric salt, and ferrous salt.

Cetylpyridinium chloride (CPC) and bromide (CPB) are preferred.

Accordingly, the present invention provides a method of removing perchlorate from a fluid which includes the step of passing the fluid over an activated carbon material selected from: bituminous coal, lignite coal, anthracite coal, wood, coconut shells, lignocellulosic material, peat, carbonaceous textiles, chemical vapor deposits, preformed plastics, preformed polymeric resins, that has been loaded with cationic monomer cetylpyridinium chloride (CPC) or bromide (CPB) or other surfactants as listed above.

The present invention still further provides a functionalized activated carbon material which exhibits a positive surface charge greater than about 0.09 milliequivalents/gram, as measured in accordance with the Surface Charge Titration Protocol at a pH of 7.5, provided that it also exhibits a BET surface area greater than 850 $m^2$/g as measured in accordance with the BET Surface Area protocol; wherein the activated carbon material is functionalized by loading with cetylpyridinium chloride (CPC) or bromide (CPB).

The present invention further provides a method for removing perchlorate from a fluid including the step of passing the fluid over an activated carbon material that has been loaded with cetylpyridinium chloride (CPC) or bromide (CPB) or another surfactant as listed above.

The present invention also provides a carbonaceous material that has been loaded or preconditioned with at least one ionic organic species and at least one metal or alkaline earth metal or halide.

The term "preconditioning" in the context of the present invention refers to creating an ionic organic species that is affixed to the carbon surface. Such ionic organic species include solid carbon carboxyl species, solid carbon hydroxyl species, solid carbon sulfonate species, solid carbon phenolic species, solid carbon lactone species, solid carbon amine species, and solid carbon pyridenium species.

The term "loading" in the context of the present invention refers to coordinating a metal or alkaline earth metal or halide with an ionic organic species and thereafter concurrently sorbing the two onto carbon surfaces from a fluid phase.

The ionic organic species is preferably at least one selected from: fatty acids, surfactants, organic carboxyl species, organic sulfonate species, organic hydroxyl species, organic phenolic species, organic lactone species, and organic amine species. The metal or alkaline earth metal is at least one selected from: iron, manganese, aluminum, copper, lead, zinc, calcium, and magnesium.

Alternatively, the metal or alkaline earth metal or halide is at least one selected from: sodium, potassium, lithium, rubidium, cesium, beryllium, magnesium, strontium, barium, radium, titanium, zirconium, vanadium, niobium, chromium, osmonium, cobalt, nickel, palladium, platinum, cadmium, boron, gallium, indium, silicon, tin, arsenic, lanthanides, and actinides. Furthermore, the metal or alkaline earth metal is at least one selected from: silver, gold, and mercury.

Another embodiment of the present invention pertains to a method for diffusing electromagnetic energy including passing the electromagnetic energy over a carbonaceous material that has been loaded with at least one ionic organic species and at least one metal or alkaline earth metal. The electromagnetic energy is preferably at least one selected from radar and sonar.

Still yet another embodiment of the present invention is a method for removing at least one oxyanion from a fluid including passing the fluid over a carbonaceous material that has been loaded with at least one ionic organic species and at least one metal or alkaline earth metal. The oxyanion is at least one selected from arsenic oxyanions, chlorine oxyanions, phosphate oxyanions, nitrogen oxyanions, osmium oxyanions, gallium oxyanions, rubidium oxyanions, and technetium oxyanions.

The present invention also provides a carbonaceous material that has been loaded with at least one ionic organic species or hydroxide species and at least one metal or alkaline earth metal. The ionic organic species or hydroxide species is at least one selected from: fatty acids, surfactants, organic carboxyl species, organic sulfonate species, organic hydroxyl species, organic phenolic species, organic lactone species, organic amine species, or hydroxide species.

The metal or alkaline earth metal is at least one selected from: iron, manganese, aluminum, copper, lead, zinc, calcium, and magnesium. The metal or alkaline earth metal is at least one selected from: sodium, potassium, lithium, rubidium, cesium, beryllium, strontium, barium, radium, titanium, zirconium, vanadium, niobium, chromium, osmonium, cobalt, nickel, palladium, platinum, cadmium, boron, gallium, indium, silicon, tin, arsenic, lanthanides, and actinides. The metal or alkaline earth metal is at least one selected from: silver, gold, and mercury.

The carbonaceous material is derived from at least one selected from the group of bituminous coal, lignite coal, anthracite coal, coconut shells, wood, lignocellulosic material, peat, and carbonaceous textiles.

The present invention also provides a method for diffusing electromagnetic energy including passing the electromagnetic energy over a carbonaceous material that has been loaded with at least one ionic organic species and at least one metal or alkaline earth metal. The electromagnetic energy is at least one selected from radar and sonar.

The present invention also provides a method for removing at least one oxyanion from a fluid including passing the fluid over a carbonaceous material that has been loaded with at least one ionic organic species or hydroxide species and at least one metal or alkaline earth metal. The metal or alkaline earth metal is at least one selected from: iron, manganese, aluminum, copper, lead, zinc, calcium, and magnesium. The oxyanion is at least one selected from arsenic oxyanions, chlorine oxyanions, phosphate oxyanions, nitrogen oxyanions, osmium oxyanions, gallium oxyanions, rubidium oxyanions, and technetium oxyanions. The fluid is also passed through a metal media that dissolves as the fluid passes over it, releasing positive-valent metal species into the fluid, provided that the positive-valent metal species reacts with an oxyanion to form a combined species.

The metal is at least one selected from: iron, manganese, aluminum, copper, lead, zinc, and titanium. The oxyanion is at least one selected from arsenic oxyanions, chlorine oxyanions, phosphate oxyanions, nitrogen oxyanions, osmium oxyanions, gallium oxyanions, rubidium oxyanions, and technetium oxyanions.

The present invention also provides a method for removing at least one oxyanion from a fluid including passing the fluid through a metal media that dissolves as the fluid passes over it, releasing positive-valent metal species into the fluid, provided that the positive-valent metal species reacts with an oxyanion to form a combined species.

The metal is one selected from: iron, manganese, aluminum, copper, lead, zinc, and titanium. The oxyanion is at least one selected from arsenic oxyanions, chlorine oxyanions, phosphate oxyanions, nitrogen oxyanions, osmium oxyanions, gallium oxyanions, rubidium oxyanions, and technetium oxyanions. The fluid also passes over a carbonaceous material that has been loaded with at least one ionic organic species or hydroxide species and at least one metal or alkaline earth metal.

The metal or alkaline earth metal is at least one selected from: iron, manganese, aluminum, copper, lead, zinc, calcium, and magnesium. The oxyanion is at least one selected from arsenic oxyanions, chlorine oxyanions, phosphate oxyanions, nitrogen oxyanions, osmium oxyanions, gallium oxyanions, rubidium oxyanions, and technetium oxyanions. The cation-loaded activated carbon material or functionalized carbonaceous material is capable of treating the fluid containing at least 50 ppb of the perchlorate, such that perchlorate is removed from the fluid to an amount of less than 4 ppb for at least 3,000 bed volumes.

Another embodiment according to the present invention includes a method for removing anionic contaminants (e.g., arsenates, arsenites, nitrates, and chromates) from a fluid including: passing the fluid over a cation-loaded activated carbon material or functionalized carbonaceous material.

Still another embodiment according to the present invention relates to a functionalized activated carbon material which exhibits a positive surface charge greater than about 0.09 milliequivalents/gram, as measured in accordance with the Surface Charge Titration protocol at a pH of 7.5, provided that it also exhibits a BET surface area greater than 850 $m^2/g$ as measured in accordance with the BET Surface Area protocol.

Yet another embodiment of the present invention includes a functionalized carbonaceous material which exhibits a positive surface charge greater than about 0.09 milliequivalents/gram, as measured in accordance with the Surface Charge Titration protocol at a pH of 7.5, provided that it also exhibits a BET surface area greater than 850 $m^2/g$ as measured in accordance with the BET Surface Area protocol, wherein the functionalized activated carbon material is formed by:

(a) loading the carbonaceous material with an organic cation polymer or cationic monomer;

(b) treating the carbonaceous material with ammonia or another reduced nitrogen-containing chemical at a temperature below about 700° C.; or (c) functionalizing with an organic cation functional group.

It is perceived that aqueous oxyanions, such as $H_2AsO_4^-$ or $HAsO_4^{2-}$, undergo a ligand exchange reaction with iron species on the carbon surface. One of our goals was to find methods that facilitated the loading of as much iron as possible onto the carbon surface, while also rendering as much of this iron to be surface-exposed in a manner that allowed it to sorb arsenic. We then conducted rapid small-scale column tests (RSSCT's) to discern the arsenic removal capacity of these iron-loaded carbons.

BET Surface Area and Pore Volume Distribution Protocol

The pore distribution and specific surface area of these granular activated carbons (GAC) were determined via ASAP 2010 (Micromeritics, USA), in accordance with U.S. Pat. No. 6,881,348.

Small-Scale Simulation Test Protocol

Small-Scale Simulation Test Protocol was conducted in accordance with U.S. Pat. No. 6,881,348, for proportional diffusivity similitude, at room temperature (20-23° C.).

Surface Charge Titration Protocol

Surface Charge Titration protocol was in accordance with U.S. Pat. No. 6,881,348, using a Mettler Toledo DL53 titrator.

Chemical Source

All chemicals were reagent grade. The experiments had employed 0.01M EDTA solutions from VWR scientific products; Palmitic acid ($CH_3(CH_2)_{14}CO_2H$) from ALDRICH; and Citric acid ($HOC(COOH)(CH_2COOH)_2$) from J. T. Baker company. Metal ions employed include Ferric chloride ($FeCl_3.6H_2O$), Ferric nitrate ($Fe(NO_3)_3.9H_2O$), Magnesium chloride ($MgCl_2.6H_2O$) and Manganese chloride ($MnCl_2.4H_2O$) from Fisher Scientific company. As (V) solution was made from $Na_2HAsO_4.7H_2O$ (Alfa Aesar).

Activated Carbon Source

Activated carbon employed included Ultracarb from USFilter-WESTATES, and three wood-based carbons, NORIT C-Grain (from NORIT), Nuchar (from Westvaco) and PICASOL carbon (from PICA). This tailoring protocol could be accomplished with activated carbons derived from lignite coal, bituminous coal, anthracite coal, wood, coconut shells, lignocellulosic materials, polymers, plastics, ion exchange resins, chemical vapor deposition of gaseous carbon, and liquid phase coagulation of dissolved organic carbon.

Iron and Arsenic Analysis

To test the iron loading on tailored GAC, a portion of the fully loaded GAC were filtered out and dried at 105° C. for 24 hours, then ashed in a muffle furnace at 600° C. for 24 hours. The ashed GAC was dissolved in 25 mL of concentrated HCl. After a minimum contact time of 24 hours, the solution was filtered through an acid-resistant, ash-free cellulose acetate membrane (0.45 μm pore size) to retain the insoluble portion of the ash. The filtrate was then diluted to 250 mL, and a portion of the thus-obtained analyte was transferred into a 20 mL, $HNO_3$ washed polyethylene bottle. Solutions were analyzed for iron by the Inductively Coupled Plasma (ICP) method. The highest iron loading was 0.99% above background. Arsenic analyses have been conducted via ion chromatography-high resolution-inductively coupled plasma-mass spectrophotometry (IC-ICP-MS), in accordance with EPA Method 6020. This instrument, is a Finnigan MAT ELEMENT High Resolution ICP-MS with a Merchantek, Nd-YAG Laser. When in normal resolution mode, it can monitor arsenic to below 1 ppb resolution.

Water Source

All small-scale column tests were carried out at room temperature of 20-23° C. The arsenic-containing ground water originated from the well of the Cool Sandy Beach Community Water System of Rutland, Mass. The perchlorate-containing groundwater originated from the Texas Street well in Redlands, Calif., or from University Park, Pa. groundwater that was spiked with perchlorate. The total Arsenic in the Rutland, Mass. groundwater was 50-55 ppb; and total perchlorate concentration in the Redlands, Calif. groundwater was 50-60 ppb. Characteristics of the Rutland groundwater were presented in Table 1.

Three oxidation protocols were tested:

(1) Oxidation by nitric acid: 2 g of carbon (US mesh 200×400) was mixed with 100 mL of 70% nitric acid for 1 hour at room temperature.

(2) Oxidation by nitric acid/sulfuric acid mixture: 2 g of carbon (US mesh 200×400) was mixed with 100 mL of acid mixture (50 mL of each concentrated acid) for 1 hour at room temperature.

(3) Oxidation by nitric acid, acetic anhydride and potassium permanganate: In this case, the activated carbon was first oxidized by adding a mixture of 15 g GAC and 10.5 g potassium permanganate to a mixture of 75 mL nitric acid and 100 mL acetic anhydride. The GAC was stirred for one hour and then the $GAC/KMnO_4/HNO_3$/acetic anhydride mixture was dumped into 1.5 L of distilled water. The oxidized GAC was then washed several times with distilled water until the pH of the wash solution neared the pH of the distilled water. This treatment increased the number of carboxyl groups on the surface of the bituminous (Ultracarb) GAC up to 1.4 meq/g (compared to 0.1 meq/g for its parent conventional Ultracarb activated carbon). This highlights the importance of preconditioning the activated carbon with solid carbon carboxyl species that exhibit a surface charge.

Oxidized carbons were thoroughly washed by distilled water to remove acid adsorbed before iron loading in 1 L of $10^{-2}$ M iron solution made from ferric chloride. In some cases, the loading solution ($10^{-2}$ M) was made from Ferrous chloride. The reason for using Ferrous iron (Fe(II)) for loading is that Fe(III) hydrolyzes to form hydroxides when the pH is higher than 3. Iron (hydr)oxide cannot diffuse easily into the internal pores of GAC. Carbon and iron solution mixture was put on a shaking table for 24 hours during the loading process.

Carbons used in these oxidation plus iron loading tests included Ultracarb from US Filter (Bituminous coal carbon) and three wood-based carbons, NORIT C-Grain (from NORIT), Nuchar (from Westvaco) and PICASOL carbon (from PICA). Other parent sources of activated carbon could be used, as listed above. Table 2 lists the results of iron loading.

TABLE 1

Characteristics of Rutland, MA Groundwater

| pH | As (μg/L) | Iron (μg/L) | Hardness mg/L as CaCO3 | TOC mg/L | Na mg/L | Mg mg/L | Chloride mg/L | Sulfate mg/L | Silica mg/L | Ca mg/L as CaCO3 | Turbidity (NTU) |
|---|---|---|---|---|---|---|---|---|---|---|---|
| 7.6-8.0 | 47-55 | 3 | 70.3 | 0.85 | 27.5 | 11.3 | 9.32 | 26.4 | 12.5 | 59.0 | 0.08 |

EXAMPLE 1

One method tested to increase iron loading was carbon oxidation. Studies have shown that the higher number of adsorbed iron ions following oxidative carbon modification correlated with a larger number of surface carboxyl- and hydroxyl-like functional groups. Liquid-phase oxidation by oxidizing agents such as concentrated nitric acid, $H_2O_2$, $(NH_4)_2S_2O_8$, and other oxidizing agents was proven effective in creating oxygen-containing surface groups.

TABLE 2

Iron loading by oxidized carbons

| Carbon | Oxidizing agent | Iron loading via $FeCl_3$ or $FeCl_2$* (% of carbon mass) |
|---|---|---|
| Ultracarb | Nitric acid | 2.28 |
| Ultracarb | Nitric acid/Sulfuric acid | 2.23 |
| Ultracarb | Nitric acid/Sulfuric acid | 4.51* |

TABLE 2-continued

Iron loading by oxidized carbons

| Carbon | Oxidizing agent | Iron loading via $FeCl_3$ or $FeCl_2$* (% of carbon mass) |
|---|---|---|
| Ultracarb | Nitric acid, acetic anhydride and potassium permanganate | 7.6* |
| Ultracarb | Nitric acid, acetic anhydride and potassium permanganate | 7.99* |
| Ultracarb | Nitric acid, acetic anhydride and potassium permanganate | 7.6 |
| NORIT C-Grain | Nitric acid | 6.52 |
| NORIT C-Grain | Nitric acid/Sulfuric acid | 15.40 |
| Nuchar | Nitric acid | 3.78 |
| Nuchar | Nitric acid/Sulfuric acid | 7.40 |
| PICA | Nitric acid | 5.63 |
| PICA | Nitric acid/Sulfuric acid | 9.13 |

Results shown in Table 2 indicate that carbon oxidation was generally very effective for iron loading. Nitric acid/sulfuric acid oxidation is better than oxidation by nitric acid alone. The nitric acid/sulfuric acid oxidized NORIT C-Grain carbon was able to facilitate an iron loading as high as 15%. Ultracarb that was oxidized via protocol 3 showed an iron loading of 7.6 to 7.99%.

EXAMPLE 2

Figure 2:
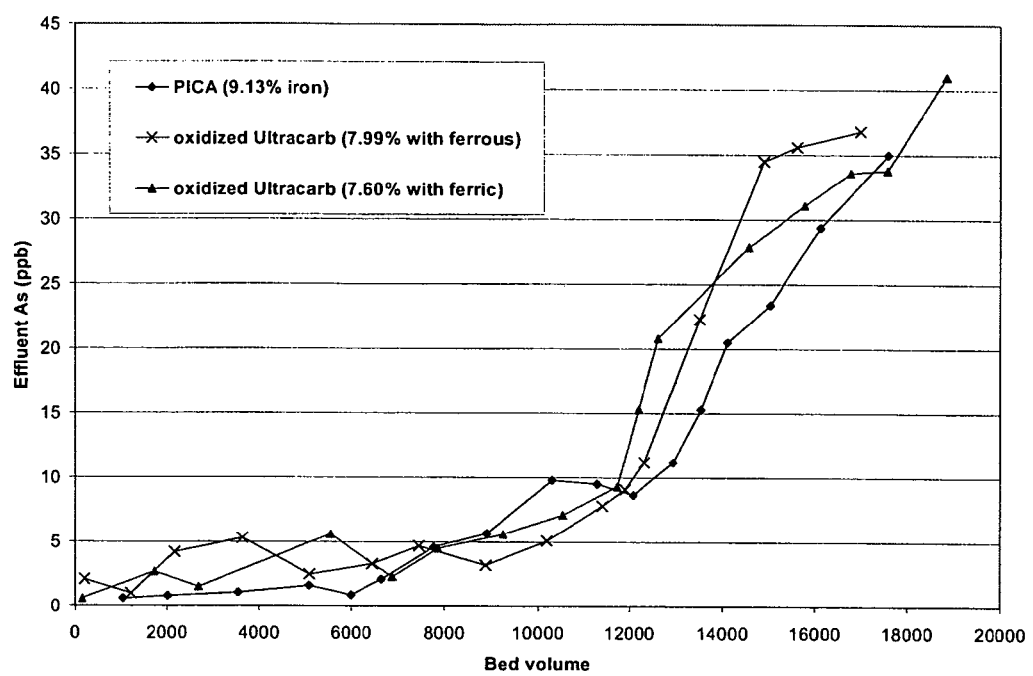
FIG. 2 shows Bed Volumes to Breakthrough for wood-based (PICA) and bituminous-based (Ultracarb) activated carbons that were preconditioned with nitric acid and sulfuric acid oxidation, and then preloaded with ferric or ferrous iron. Influent water contained 50-60 ppb arsenic.

Rapid small-scale column tests were carried out with oxidized and then iron-loaded NORIT C-Grain, Nuchar and PICA carbons since those carbons had very high iron loading (7.4-15%). FIGS. 1 and 2 are the column test result for arsenic removal by those three carbons. Breakthrough bed volume was set as the bed volume of water passed through column until the As concentration from the effluent first reaches 10 ppb. FIGS. 1 and 2 shows that oxidized PICA and Ultracarb carbon showed the highest capacity for arsenic removal.

EXAMPLE 3

The inventors also conducted tests to determine how much iron could be preloaded onto activated carbon when the iron was complexed with organic carboxyl species in the water phase be sorption into the activated carbon. We have hypothesized that because activated carbon has a high surface area, if we can cover this surface with a fine film of iron, then we can get the most efficient removal of arsenic, on the basis of pounds of iron required per pound of arsenic removed. Moreover, if we pre-loaded activated carbon with fatty acid or chelating agent-iron complexes, we could increase the GAC's capacity to adsorb iron, and hence arsenic. Citrate acid, L-Glutamic acid and EDTA were tested during the period. In addition, ferric ammonia citrate was used directly for iron loading instead of citric acid plus ferric chloride.

Two loading protocols were employed for iron loading:

(1) One-step protocol: A predetermined amount of carbon was added to a fatty acid or chelating agent-iron solution in which the acid (or chelating agent) and iron (by ferric chloride) had a 1:1 molar ratio. The carbon and solution mixture was then put on a shaking table for 2 days.

(2) Two-step protocol: A predetermined amount of carbon was added to a fatty acid or chelating agent solution without the iron. The mixture was shaken for 2 days for acid or chelating agent to adsorb first. Iron (ferric chloride) was then added to the mixture to make a acid or chelating agent molar ratio 1:1 and thus produced mixture was shaken for another 2 days. Table 3-5 lists the results of Iron loading with various sources of ionic organic species and hydroxide species.

TABLE 3 results of Iron loading with citric acid, L-glumatic acid, and ferric ammonia citrate

| Loading protocol | One-step | Two-step | One-step | One-step | One-step |
|---|---|---|---|---|---|
| Chemical | citric acid Ferric chloride | L-glumatic Ferric chloride | L-glumatic Ferric chloride | ferric ammonia citrate | ferric ammonia citrate |
| Conc. (mol/L) | 2.5 | 0.05 | 0.1 | 1 | 2.5 |
| Volume (mL) | 10 | 100 | 100 | 25 | 25 |
| Carbon mass (g) | 1 | 0.5 | 0.5 | 0.5 | 0.5 |
| Carbon particle size (US mesh) | 60 × 80 | 60 × 80 | 60 × 80 | 60 × 80 | 60 × 80 |
| Iron loading (%) | 2.4 | 2.0 | 3.0 | 1.9 | 1.7 |

TABLE 4

Results of iron loading using EDTA

| Loading protocol | One-step | Two-step | Two-step | Two-step | Two-step | Two-step | Two-step |
|---|---|---|---|---|---|---|---|
| Conc. (moL/L) | 0.1 | 0.2 | 0.2 | 0.5 | 0.5 | 1 | 1 |
| Volume (mL) | 50 | 10 | 25 | 10 | 25 | 20 | 10 |
| Carbon dosage (g) | 1 | 0.5 | 0.5 | 0.5 | 0.5 | 0.3 | 0.5 |
| carbon size (US mesh) | 60 × 80 | 60 × 80 | 12 × 40 | 60 × 80 | 12 × 40 | 12 × 40 | 200 × 400 |
| Iron loading (%) | 1.8 | 2.6 | 3.5 | 3.1 | 3.9 | 3.7 | 2.4 |

Results indicate that the amount of iron loaded on activated carbon depended highly on the concentration of loading solution.

When the concentration of EDTA-Fe solution increased from 0.1 to 0.5, the iron loading increased from 1.8% to 3.9% (Table 4). L-glutamic acid was fairly effective; it enabled an iron loading of 3%. Ferric ammonia citrate could only get 1.9% iron loading even if the solution concentration was as high as 1 mol/L. The addition of a co-complexing metal, like Magnesium, Manganese or copper, did not have a significant effect on iron loading.

The Fe-oxide coated GAC got an extraordinally high iron loading result of 33.6%.

TABLE 5

| Tailored carbon | Iron loading $[Fe(III)]_{ini}$ (M) | Iron content |
|---|---|---|
| Fe-oxide (33.6) | 2 | 33.6% |
| Nitric, sulfuric acid-Fe (7.89)* | 2 | 7.89% |
| Citrate-Fe (2.1) | 0.2 | 2.1% |
| Citrate-Fe (1.76) | 0.01 | 1.76% |
| Citrate-Fe—Cu (1.54) | 0.05 | 1.54% |
| Citrate-Fe—Mn (1.36) | $5 \times 10^{-4}$ | 1.36% |
| Citrate-Fe (1.32) | $10^{-3}$ | 1.32% |
| Citrate-Fe (1.07) | $10^{-3}$ | 1.07% |
| Citrate-Fe—Mg (0.81) | $5 \times 10^{-4}$ | 0.81% |
| EDTA-Fe (1.33) | $10^{-3}$ | 1.33% |
| Palmitic acid (0.54) | $10^{-4}$ | 0.54% |

*The carbon used in this test is wood based carbon.

EXAMPLE 4

Figure 3:
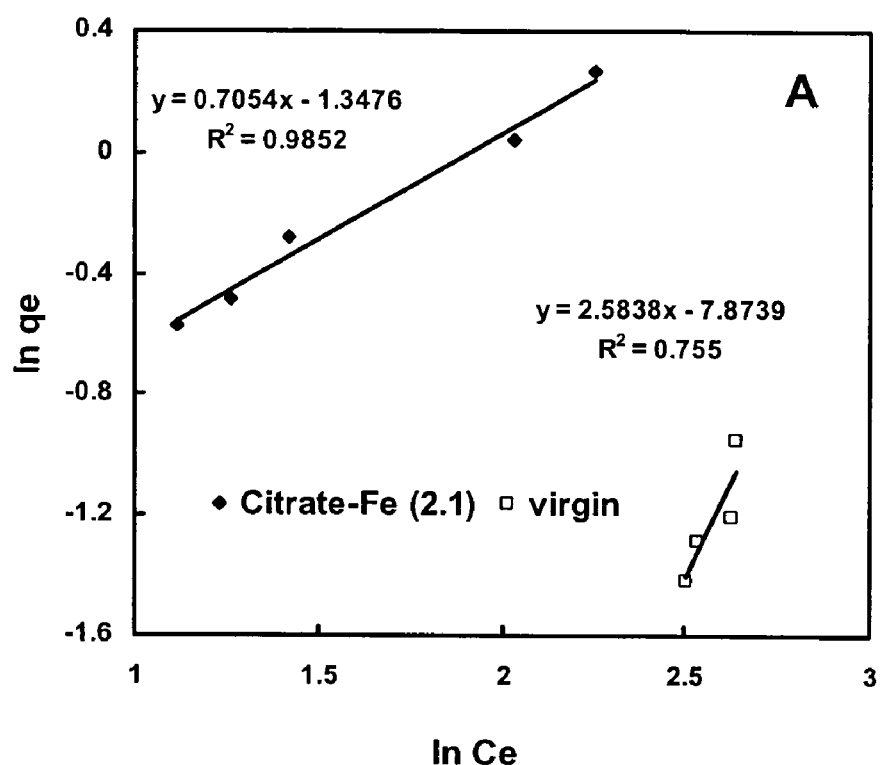
FIG. 3 shows the Adsorption Isotherm of Citrate-Fe preloaded GAC and Virgin GAC, with Freundlich isotherm linearization.

As shown in FIG. 3, isotherm results are illustrated. In these experiments, a prescribed amount of activated carbon (10-100 mg) was added to 50 mL arsenic-spiked Rutland groundwater (Total arsenic concentration is 550 ppb). The water pH had been adjusted to 6 with 0.1 M HCl. The mixtures were then put on the horizontal shaking table and shaken at 120-150 rpm for 48 hours. Then the resulting solution was analyzed for arsenic. The results fit with both Freudlich and Langmuir Isotherm; and the $R^2$ value is slightly higher with Langmuir Isotherm. The highest $q_e$ value obtained is 1.8 mg/g, which was obtained at a Ce value of 178 ppb.

EXAMPLE 5

Figure 4:
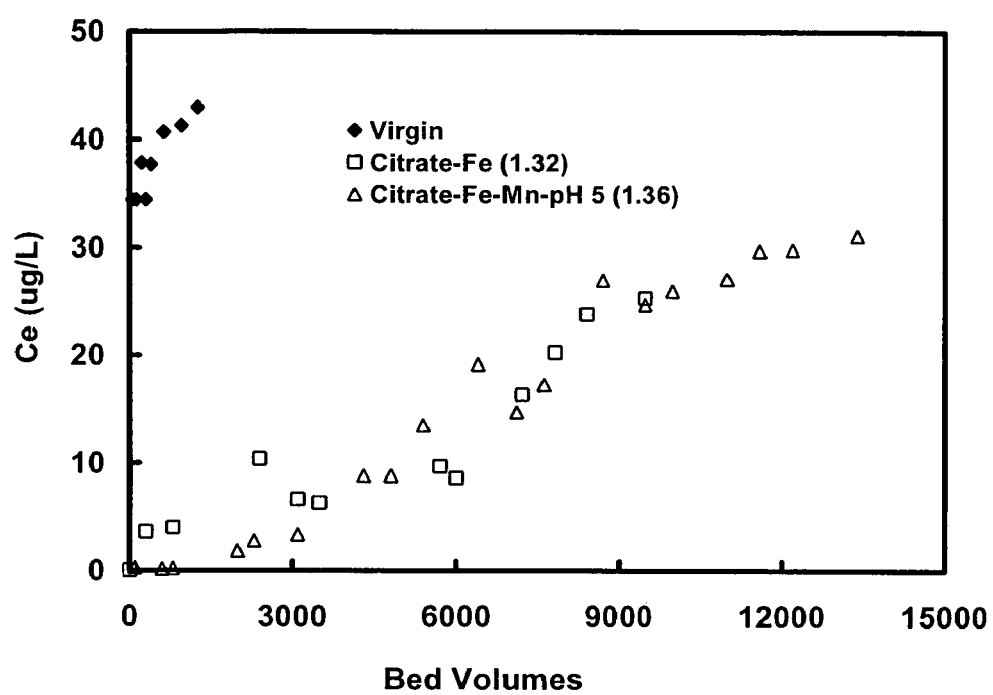
FIG. 4 shows RSSCT's of virgin and Citrate-Fe preloaded GAC.
Figure 5:
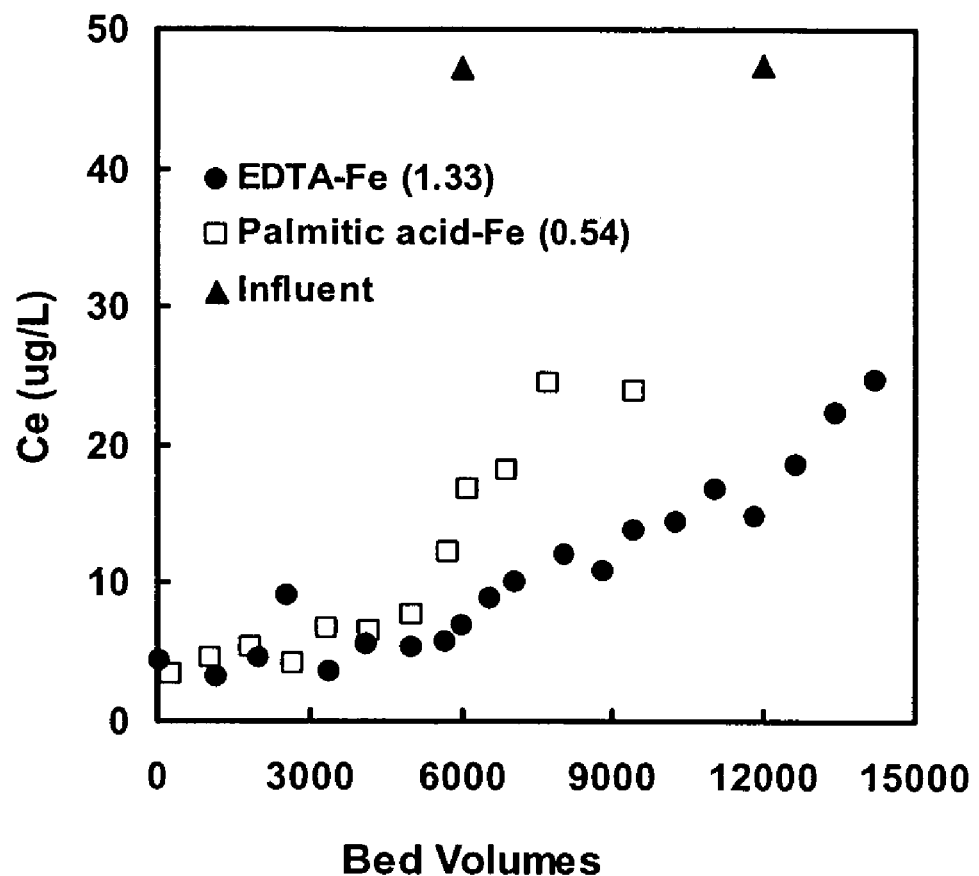
FIG. 5 shows RSSCT's of EDTA-Fe and Palmitic acid-Fe preloaded GAC.
Figure 6:
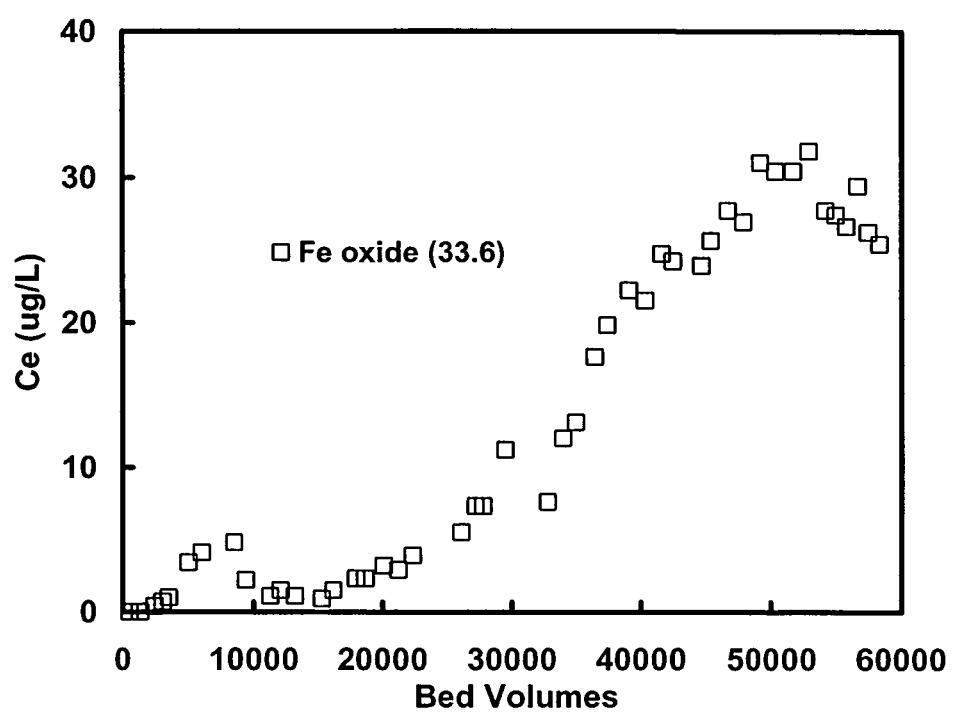
FIG. 6 shows RSSCT's of Fe-oxide coated GAC.

Arsenic breakthrough behaviors for virgin carbon and various kinds of tailored carbon are explored with rapid small-scale column tests (RSSCT's), and results are illustrated in FIGS. 4-6. All RSSCT's herein were operated with the pH adjusted by HCl to pH 6, except as noted otherwise, i.e. except for the citrate-Fe—Mn (1.36) preloaded carbon (pH 5.0).

These RSSCT breakthrough curves revealed that organic carboxyl-Fe preloaded carbons could be fairly effective for arsenic removal. In several of these experiments, 0.5-4 grams Ultracarb was mixed with organic carboxyl-Fe solution at concentration of $10^{-4}$ to 1 mol/L, and then agitated on a shaking table at 120-150 rpm for 2~3 days. The organic carboxyl species included citrate, ethylenediamine tetraacetic acid (EDTA), L-glumatic acid, and palmitic acid.

The organic carboxyl species could include many other species that have a carboxyl functional or iron-complexing group. The adsorbent was filtered out and washed with distilled water until no color in the washing water could be discerned. The tailored carbon was dried at 104° C. overnight and stored in desiccators before use. Sometimes when preloading GAC with organic carboxyl-Fe, the carbon was loaded in two steps-the organic carboxyl species in the first step, and iron in the second step.

To achieve an iron oxide coating on activated carbon, 2 gram bituminous based SAI carbon (#200×400) was added to 8 mL 2M $Fe(NO_3)_3 \cdot 9H_2O$ solution. Also, 0.1 mL 10M sodium hydroxide was added to increase the pH. The mixture was heated at 104° C. overnight. The result was a mixture of iron oxide coated carbon and goethite; the mixture was sieved and washed with distilled water. The thus obtained carbon was designated as Fe-oxide (33.6) GAC.

A wood based activated carbon (#60×80) was first soaked in a mixture of concentrated nitric acid and sulfuric acid for 1 day. The carbon were then filtered and dried at 104° C. for 24 hours. After that, the carbon was kept in a vacuum desiccator until it was used for iron loading. In the loading process, 0.3 gram carbon was added to 25 mL 2M Fe $(NO_3)_3 \cdot 2H_2O$ solution and agitated on a shaking table for 48 hours. The carbon was then filtered out and washed with distilled water.

As shown in FIGS. 4-5 and Table 6, the columns with organic carboxyl-Fe preloaded carbon exhibited 10 ppb breakthrough at 5500-7000 bed volumes (BV); and they reached 25 ppb breakthrough at 8500-15,000 BV. The EDTA-Fe preloaded carbon lasted the longest of these, with 7,000 BV to 10 ppb breakthrough and 15,000 BV to 25 ppb breakthrough.

When the iron was complexed with hydroxide (33% iron loading), the GAC exhibited very good RSSCT performance. The 10 ppb breakthrough was reached at 34,000 BV (FIG. 6).

TABLE 6

Iron content and Breakthrough bed volume of GACs.

| | Alcohol used | Water pH | Bed Volumes to 10 ppb Breakthrough | Description |
|---|---|---|---|---|
| V6 | | 6 | 200 | Virgin Ultracarb, column test operated at pH 6 |
| V8 | | 8 | 200 | Virgin Ultracarb, column test operated at pH 8 |
| PII 6 | IsopropylAlcohol | 6 | 10,000 | Ultracarb pretailored with $10^{-4}$ M iron-palmitic acid (the latter was dissolved with isopropyl alcohol), column test operated at pH 6 |
| PII 5.5 | IsopropylAlcohol | 5.5 | 500 | Ultracarb preloaded with $10^{-4}$ M iron-palmitic acid (the latter was dissolved with isopropyl alcohol), column test operated at pH 5.5 |

TABLE 6-continued

Iron content and Breakthrough bed volume of GACs.

| | Alcohol used | Water pH | Bed Volumes to 10 ppb Breakthrough | Description |
|---|---|---|---|---|
| PIE 8 | Ethanol | 8 | 1,000 | Ultracarb preloaded with $10^{-4}$ M iron-palmitic acid dissolved with ethanol, column test operated at pH 8 |
| PIE 6 | Ethanol | 6 | 6,000 | Ultracarb preloaded with $10^{-4}$ M iron-palmitic acid dissolved with ethanol, column test operated at pH 6 |

EXAMPLE 6

The authors also sought to determine whether performance could be enhanced by solubilizing iron into the Rutland groundwater just before it flowed through the GAC bed. For these tests, the GAC was preloaded with citrate-Fe to an iron content of 1.07%, and this preloaded GAC was inserted into the mini-column chamber. Next, galvanized steel fittings were placed before and after this mini-column; and the groundwater pH was adjusted to pH 6.0.

Figure 7:
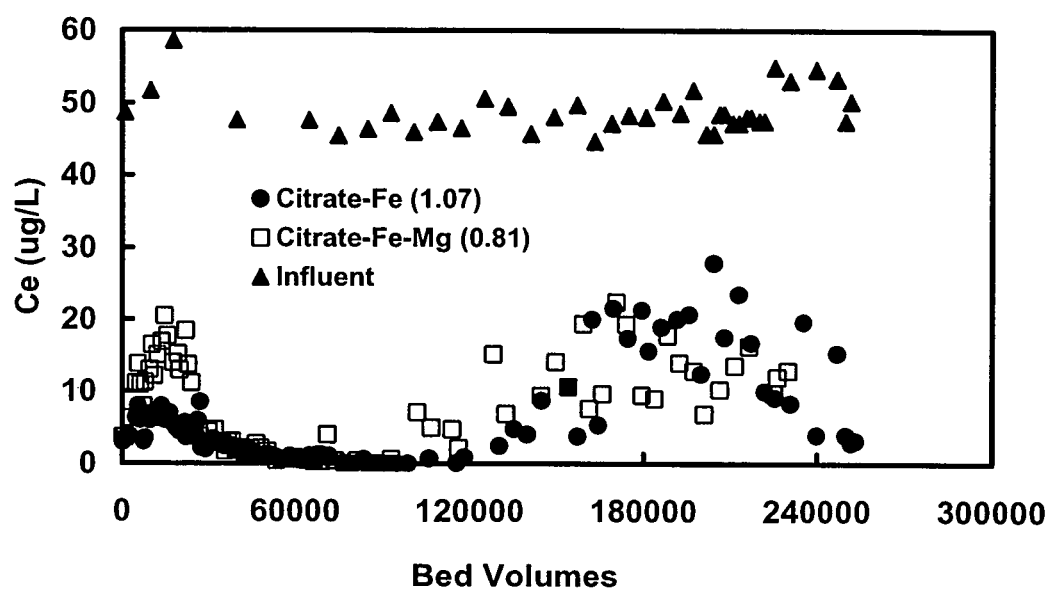
FIG. 7 shows RSSCT's of Citrate-Fe preloaded GAC augmented with soluble iron.

As shown in FIG. 7, the effluent As rose from 4 ppb up to 8-9 ppb during the first 10,000-20,000 BV, but did not exceed 10 ppb. Then, the authors ran out of Rutland water at 26,000 BV (because the columns were operating for so long). Six days later, just after treatment operation was resumed (with fresh Rutland water) the effluent arsenic concentration dropped to below 4 ppb; and it remained there for the next 120,000 BVs. It reached 10 ppb at 150,000 BV and showed no signs of full exhaustion above 25 ppb, even at 250,000 BV. A nearly repeat experiment was conducted with Citrate-Fe—Mg (0.81) carbon. The magnesium was added to simulate a harder water condition when preloading the Fe. This Citrate-Fe—Mg column also had to be stopped at 22,000 BV for 6 days (due to running out of water) before resuming. This result was similar, although the Citrate-Fe GAC worked slightly better.

Another column that operated with the galvanized steel fittings is almost a duplication of Citrate-Fe (1.07), but this one was only operated for 24,000 bed volumes, at which time the effluent arsenic was 14 ppb. This run was not stopped during its operation; and this column showed more stable performance than the first run.

Figure 8:
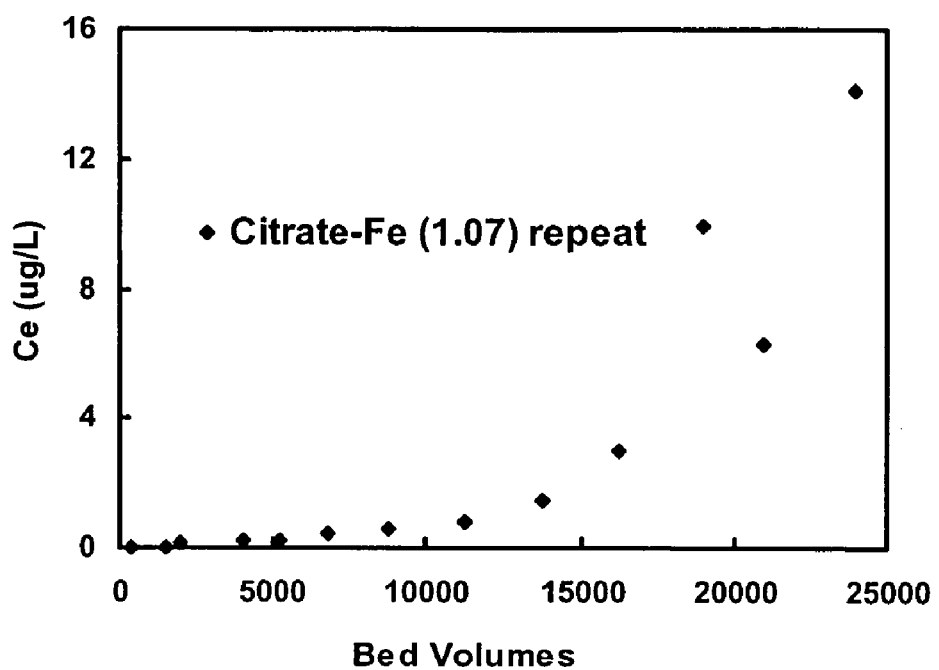
FIG. 8 shows RSSCT's of Citrate-Fe (1.07), augmented with soluble iron (duplicate).

The carbon bed from the Citrate-Fe (1.07) duplicate test (i.e. FIG. 8 column) was taken out and analyzed with a sequential leaching method, as presented in Table 7. Based on the mass ratio of As/activated carbon, the total As adsorbed into this 1.67 g of activated carbon after 25,000 BV was 2.92 mg. In comparison, the total arsenic removed, as calculated from the difference between the influent and effluent concentrations, summed to 3.16 mg. Thus, from this comparison, one could say that 92% of the arsenic that had been removed, was captured within the carbon bed. The remaining 8% arsenic was presumably captured by the glass wool, tubing, and fittings; and this perspective is consistent with another mass balance below.

The total iron leached out via the sequential leaching steps 2 and 3 amounted to 46 mg, which was 23 times the preloaded amount of 2 mg. To discern how the arsenic was removed in the columns that operated with galvanized steel fittings, we conducted digestion of all the possible arsenic adsorbents. Glass wool, pipes and galvanized steel fittings were digested according the standard method 3030E and 3030F (Clesceri, 1998). The carbon bed was digested to discern iron and arsenic content by a sequential leaching method. A revised 3-step leaching protocol was introduced here (1) 1N ammonium acetate (2) 3N hydrochloride (3) 3N nitric acid.

Thus, arsenic mainly adsorbed onto activated carbon, but it was the iron that dissolved from the fittings and was subsequently captured by the activated carbon that adsorbed most of the arsenic. The variable redox level of the carbon, iron, and sulfur in the GAC may have aided this arsenic removal within the GAC bed.

TABLE 7

Sequential leaching results on 1.4 g of representative activated carbon (out of 1.67 g used) from the Citrate-Fe (1.07) duplicate column after 25,000 BV

| Carbon | As (µg) | Fe (µg) | Fe/As (g/g) | Fe/As (mole/mole) |
|---|---|---|---|---|
| Normalize to 1.67 g GAC | 2982 | 54,597 | 18.3 | 24.4 |

We also conducted sequential leaching for a representative 0.75 grams of the activated carbon (from 1.67 g total GAC+Fe+O) that had been used in the Citrate-Fe (1.07) column for 250,000 BV (i.e. the activated carbon from FIG. 7). These results, combined with results from the digestion of the tubing and glass wool for the column, appear in Table 8. The total As accounted for, per Table 8, summed to 16.8 mg of As. In comparison, the total As removed, as calculated from the difference between the influent and effluent was 29.1 mg.

When comparing these values, one surmises that 7.45 mg (26%) of all removed arsenic was adsorbed by the carbon bed. Another 2.6% arsenic was removed by the effluent tubing, and the fittings removed 5.4% of the arsenic. The glass wool that was analyzed had removed 31.4% of the arsenic. This left about a third of the removed arsenic that was possibly sorbed with the iron deposits that had accumulated on the influent glass wool. The influent glass wool had been changed-out three times during the 250,000 BV of operation. Utilizing this process at full-scale would necessitate that a proper dosing of corroded iron could be achieved by means of properly adjusting the air (via sparging), pH, electrochemistry, oxidation-reduction potential, temperature, oxygen content, electric potential, electric current, and pressure.

TABLE 8

Arsenic distribution in Citrate-Fe (1.07) after 250,000 BV

| Adsorbents | Fe (µg) | As (µg) | Fe/As (g/g) | Fe/As (mole/mole) |
|---|---|---|---|---|
| Effluent tubing | 26,200 | 760 | 34 | 45 |
| Bottom (Entry) Glass wool | 82,400 | 8,380 | 10 | 13.2 |
| Top (Exit) Glass wool | 1,480 | 230 | 6.3 | 8.3 |
| HCl washed rust from Galvanized steel fittings | — | 1,600 | — | — |
| 0.75 g carbon* | 40,730 | 3,724 | 11 | 14.7 |
| Line 5, normalized to 1.67 g carbon | 90,692 | 8292 | 11 | 14.7 |
| Total (with 1.5 g carbon) | 200,772 | 19,262 | 10.4 | 13.9 |

*A representative 0.75 g activated carbon, was evaluated, out of 1.67 g loaded activated carbon present at the start of this RSSCT run.

The 250,000 BV operation simulated 10 years of full-scale operation for a 20 minute EBCT or 4 years for an 8 minute EBCT. Thus, this hybrid system that combines iron preloading with in-flow iron solubilization appears to offer considerable promise for effectively and efficiently removing arsenic.

EXAMPLE 7

Iron content is an important parameter to look at when choosing the arsenic removal adsorbents. But it's not always true that higher iron content media will perform better than the low iron content media. For example, Palmitic acid-Fe (0.54) GAC contained half the iron content of the Citrate-Fe—Mn (1.36) GAC, but they exhibited very similar arsenic breakthrough curves: they both reached 10 ppb breakthrough at 5500 bed volumes. Moreover, Fe-oxide (33.6) GAC hosted a 60 times higher iron content than did Palmitic acid-Fe (0.54) GAC; whereas it exhibited 10 ppb arsenic breakthrough at 28,000 BV (i.e. about 5 times longer). What's important is that the iron avails itself to the arsenic sorption.

When employing the organic carboxyl-Fe preloading method or the pre-oxidation-Fe protocol, the iron apparently loaded in such a manner that much of it was available to sorb arsenic, whereas with the iron precipitation protocols (both herein and by others), considerably less of the iron was exposed to where it could sorb arsenic. Our hypothesis has been that with the proper complexing species, the carbonaceous fringe of the complexing agent could sorb onto the graphene planes, while the carboxyl group, with complexed iron, could align itself in the direction away from the graphene planes. By this approach, then, we could create a monolayer of iron atoms along each available graphene plane surface.

The data in Tables 7 and 8 (above) and 9 (below) could perhaps shed light on the extent to which our various modes of preloading and concurrent solubilization have achieved this goal. With the palmitic acid-Fe GAC (0.54), every 12 moles of iron captured 1 mole of arsenic, and this was lower than the 18-20 moles Fe/mole As when EDTA or citrate was used. Both of these values were considerably lower than when iron was complexed with hydroxide on the GAC (125 mole Fe/mole As).

From the Table 7 and 8 data, it is noted that the lowest molar ratio was achieved in the exit glass wool, where 8 moles Fe captured 1 mole As. As presented in Table 9, the Fe/As molar ratios that we have achieved herein are considerably lower than have been achieved by other iron-containing media; and this highlights the fundamental significance of what we have accomplished.

TABLE 9

Arsenic adsorption capacity of organic carboxyl-Fe GAC

| Adsorbents | % Iron preloading | Operating pH | g Fe/ g As | mol Fe/ mol As |
|---|---|---|---|---|
| Fe-oxide GAC (33.6) | 33.6 | 6 | 94 | 125 |
| EDTA-Fe GAC (1.3) | 1.3 | 6 | 13.4 | 18 |
| Palmitic acid-Fe GAC (0.54) | 0.54 | 6 | 9.1 | 12.2 |
| Citrate-Fe GAC (1.32) | 1.32 | 6 | 14 | 18.5 |
| Citrate-Fe—Mn GAC (1.36) | 1.36 | 5 | 15 | 20 |
| Citrate-Fe GAC (1.07) | 1.07 | 6 | 20 | 27 |
| Oxidized Ultracarb-Fe (7.6-7.99) | 7.6-7.99 | 6 | 50-52 | 65-70 |

EXAMPLE 8

In order to achieve perchlorate removal with tailored activated carbons, the inventors considered means of chemically linking quaternary ammonium groups onto the surface of activated carbon. This can be achieved by several methods.

In addition to pre-loading the GAC with quaternary ammonium compounds, quaternary ammonium groups can be chemically linked to the surface of the activated carbon by several methods. Halogen atoms (F, Cl, I, Br, At) can be introduced onto the activated carbon. Halogenation of the activated carbon can be accomplished by treating the activated carbon with the elemental halogens or by halogen containing chemicals (such as chloromethyl ethyl ether, 3,3 bis-chloromethyl benzoyl peroxide, or thionyl chloride). The introduced halogen group can then be reacted with a tertiary amine (such as trimethylamine) to create a quaternary ammonium group on the activated carbon.

The activated carbon can also be nitrated (introduction of $-NO_2$ groups) or aminated (introduction of $-NH_2$ groups). Nitro groups ($-NO_2$) groups can be introduced onto carbon compounds through reactions with fuming nitric acid and acetic anhydride or nitrogen dioxide gas. Nitro groups can then be converted to amine groups ($-NH_2$) by several processes including reaction with hydrazine hydrate or sodium hydrosulfite and ammonium hydroxide. Amine groups can be directly introduced onto the activated through processes such as treatment in ammonia gas or ammonium hydroxide. The $-NH_2$ groups on the carbon surface can then be reacted with a chemical containing two halogen atoms such as 1,2-Dichloroethane. One of the chlorine atoms can react with the amine group to create a N—C linkage and HCl. The remaining halogen atom, in this case Cl, can then be reacted with a tertiary amine (as described above) to form the quaternary group. Amine groups can also be converted to a quaternary group via stepwise reaction with alkyl halides.

Carboxyl and phenol groups on the carbon surface can be used as a starting point for the creation of quaternary ammonium groups on the activated carbon surface. These acidic groups can easily be introduced on the surface of activated carbon via numerous oxidation processes. Carboxyl or phenol groups can then be reacted with a chemical containing a terminal acyl chloride, hydroxyl, or amine group. For example, a carboxyl group can be reacted with the hydroxyl group of choline chloride (which contains a quaternary ammonium group on the other end $((CH_3)_3N(Cl)CH_2CH_2OH)$ to form an ester linkage between the carbon surface and the chlorine chloride. The terminal amine group on a chemical such as tetraethylenepentamine $((NH_2CH_2CH_2NHCH_2CH_2)_2NH)$ can be reacted with a surface carboxyl group. These amine sites can then serve as a place in which quaternary ammonium groups can then be linked as described above.

Surface carboxyl and phenol groups can also be converted to acyl chloride groups by reaction with thionyl chloride. The acyl chloride groups that are introduced onto the activated carbon surface can then be reacted with a chemical containing a terminal carboxyl or amine group. Quaternary groups can then be added following additional steps described above. Acyl chloride groups can also serve as a site in which quaternary ammonium compounds can be chemically linked via a cationic polymerization reaction. The acyl chloride group is first reacted with silver perchlorate. This reaction exchanges the chloride atom on the activated carbon surface with perchlorate and silver chloride is formed. Polymerization of a vinyl monomer (containing a quaternary group or a site that can be later converted to a quaternary group) can then occur at the site. Examples of chemicals that contain or through additional steps could contain a quaternary ammonium group are vinylbenzyltrimethylammonium chloride, polyvenylbenzyltrimethylammonium chloride, diallyldimethylammonium chloride, benzylchloride, and styrene. They could also include these same species where bromide, fluoride, or iodide is the carrier halide rather than chloride. The same cationic polymerization reactions can also be performed at a benzylium perchlorate site. Cationic polymerization can also be used to link a chemical such as acrylic acid, which can then be used as sites to which iron can be adsorbed for subsequent arsenic removal.

Azo groups (—N═N) can also be as a site in which polymerizable chemicals can be linked to the GAC surface. These azo groups are located within the structure of a larger chemical that can be linked to a carboxyl, phenol, or acyl chloride group on the surface of the activated carbon by an amide, ester, or other bond.

Aldehyde groups on the activated carbon surface can first be converted to a tertiary amine, and then finally to a quaternary ammonium group by reaction with an alkyl halide.

Quaternary ammonium compounds lacking a large hydrophobic tail but containing a polymerizable carbon-carbon double bond, such as vinylbenzyltrimethylammonium chloride can also be pre-loaded onto activated carbon. These chemicals can be then induced to polymerize within the pores of the activated carbon by methods such as gamma radiation. This will make it harder for individual monomers to desorb from within the pores of the activated carbon.

Figure 9:
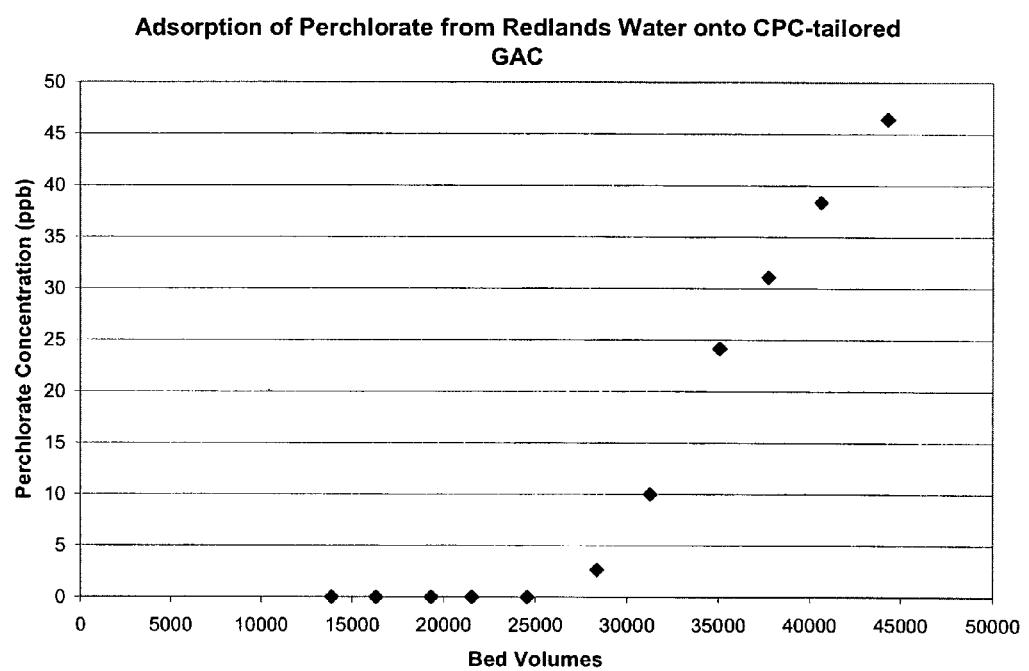
FIG. 9 shows Adsorption of Perchlorate from Redlands water onto cetylpyridinium chloride-tailored GAC.

Cetylpyridinium chloride can also be used to pre-load activated carbon to provide a means to increase the capacity for perchlorate. 0.25 grams of cetylpyridinium chloride (CPC) was pre-loaded onto SAI GAC by recirculating a 0.4% solution of CPC through a RSSCT column for 2 days. Redlands water (75 ppb $ClO_4^-$) was then passed through an RSSCT column containing the CPC-tailored GAC at a flow rate simulating an 8-minute empty bed contact time with full size grains. This GAC was able to remove perchlorate to below detectable levels for 27,000 bed volumes. These results are shown in FIG. 9 and compare favorably among the cationic surfactants used.

Figure 10:
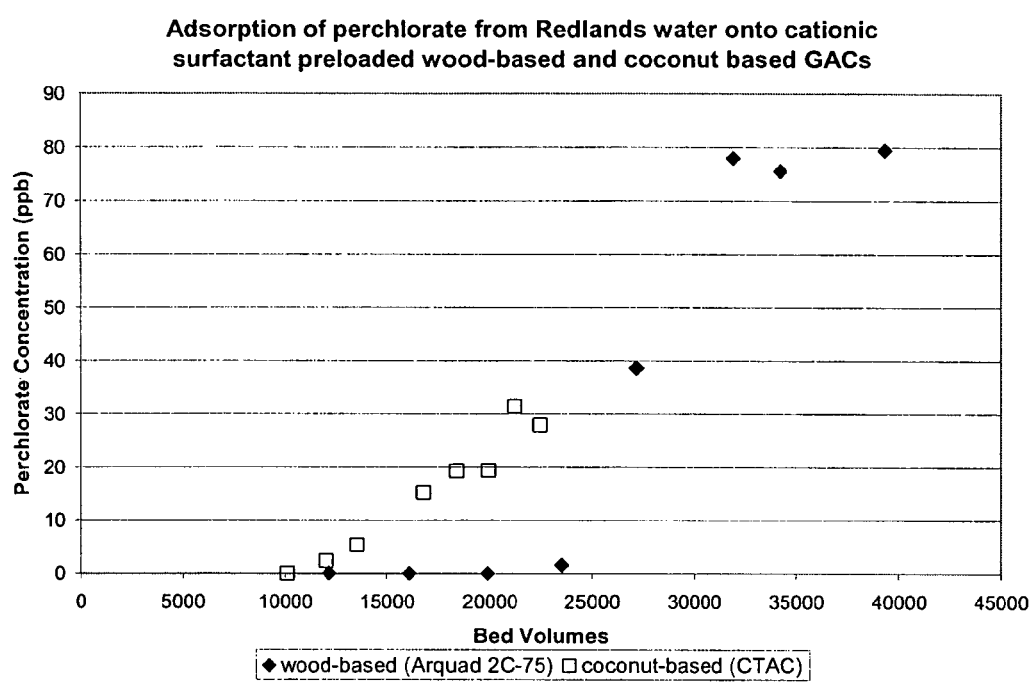
FIG. 10 shows Adsorption of perchlorate from Redlands water onto cationic surfactant preloaded wood-based and coconut based GACs.

In addition to tailoring bituminous and lignite GACs for increased perchlorate removal, wood based (MeadWestvaco's BioNuchar 90) and coconut GAC (USFilter's AquaCarb 1230C) were also pre-loaded with cationic surfactants. 0.84 g of BioNuchar was placed in an RSSCT column. The wood-based GAC was then pre-loaded by recirculating a 0.4% solution of Arquad 2C-75 for a period of two days. This recirculating process resulted in a surfactant loading of 0.6 g surfactant per gram GAC. Redlands water was then passed through the column. Initial breakthrough of perchlorate was detected at 23,500 BV with full breakthrough of perchlorate occurring around 30,000 BV. These results are shown in FIG. 10.

For coconut GAC, 1.41 g of AquaCarb 1230C was placed in an RSSCT column. A 0.4% solution of CTAC was then recirculated for 2 days resulting in a CTAC pre-loading of 0.2 grams per gram GAC. Redlands water was then passed through the column. Initial breakthrough of perchlorate was observed after 12,000 BV had been treated by the RSSCT column. An effluent concentration of 30 ppb was observed at 21,000 BV. The results are also shown in FIG. 10.

Figure 11:
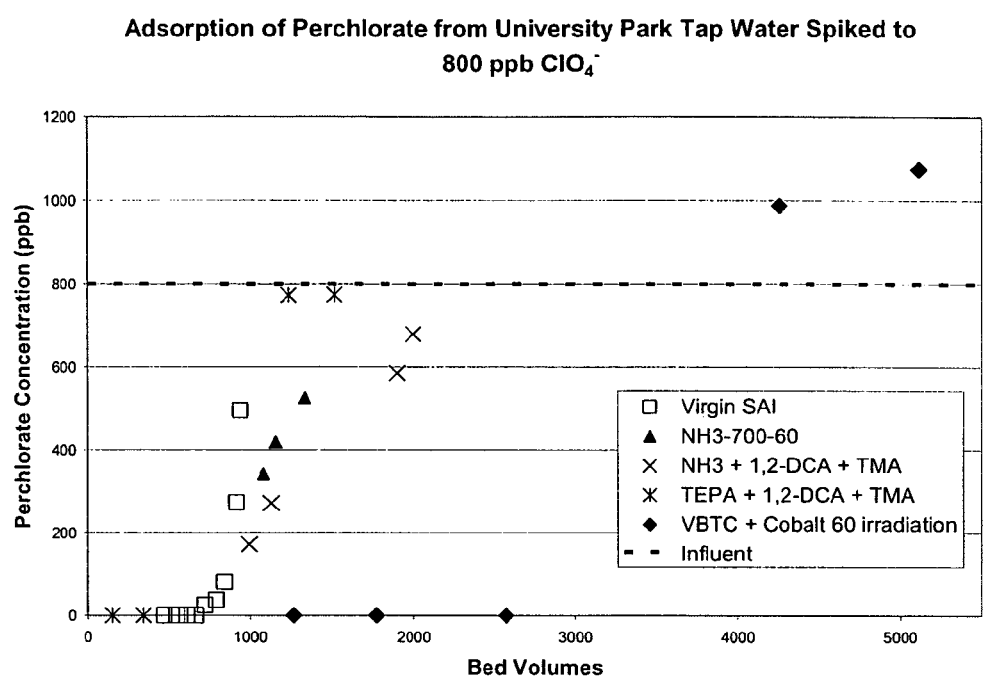
FIG. 11 shows Adsorption of perchlorate from University Park Tap Water spiked with 800 ppb perchlorate.

In other tests, virgin SAI GAC was able to treat 700 BV of University Park, Pa. tap water that had been spiked to 800 ppb perchlorate. This is shown in FIG. 11. GAC that had been treated in ammonia gas at 700° C. for 60 minutes is also shown in FIG. 11 as an additional benchmark. This ammonia-tailored GAC was able to remove perchlorate from tap water containing 800 ppb $ClO_4^-$ for a period slightly longer than that of the virgin GAC. By treating this ammonia tailored GAC with 1,2-dichloroethane (1,2-DCA) and then with trimethylamine (TMA), —$NH_2$ groups that were introduced onto the GAC surface can be converted to quaternary ammonia sites. The ammonia tailored GAC was treated in $NH_3$ at 700° C. for 60 minutes. The ammonia tailored GAC treated with 1,2-DCA and TMA showed an increase in capacity for perchlorate in comparison to the ammonia tailored GAC FIG. 11.

Also shown in FIG. 11 is GAC modified by tetraethylenepentamine (TEPA) and vinylbenzyltrimethylammonium chloride (VBTC). The GAC modified by TEPA was first oxidized by adding a mixture of 15 g GAC and 10.5 g potassium permanganate to a mixture of 75 mL nitric acid and 100 mL acetic anhydride. The GAC was stirred for one hour and then the GAC/$KMnO_4$/$HNO_3$/acetic anhydride mixture was dumped into 1.5 L of distilled water. The oxidized GAC was then washed several times with distilled water until the pH of the wash solution neared the pH of the distilled water. This treatment increased the number of carboxyl groups on the surface of the GAC up to 1.4 meq/g (compared to 0.1 meq/g for its parent conventional activated carbon). Other experiments have shown functional groups on the surface of the GAC of approximately 0.2, 0.5, 0.8, and 1.1 meq/g.

Four grams of this oxidized activated carbon was then immersed TEPA at a temperature of 190° C. for 24 hours. This will allow terminal amino groups on the TEPA surface to react with surface carboxyl groups, creating an amide link between TEPA and the GAC surface. 2.67 grams of the TEPA modified GAC was then reacted with 4 mL 1,2-DCA in 50 mL ethanol. A terminal chlorine atom in 1,2-DCA can react with an amine group on the linked TEPA, linking the 1,2-DCA to the TEPA molecule via a N—C bond. The other chlorine atom of 1,2-DCA can then serve as a site in which TMA can react, forming a linked quaternary ammonium group. This TEPA+ 1,2-DCA+TMA activated carbon was able to produce results that appeared to be on par with the virgin GAC, as shown in FIG. 11.

GAC was also pre-loaded with venylbenzyltrimethylammonium chloride (VBTC) (0.14 grams per gram GAC). The VBTC-tailored GAC was then subjected to 4 kGy $^{60}$Cobalt irradiation in an attempt to polymerize the material within the pores of the GAC, making it more difficult for the smaller VBTC molecule to desorb from the GAC in subsequent testing. This VBTC modified GAC was able to treat approximately 3000 BV of the 800 ppb spiked University Park tap water prior to the detection of perchlorate in the effluent (FIG. 11). This represents a four-fold increase in comparison to the parent conventional GAC. Subsequent leaching tests indicated that at least some of the VBTC had not fully polymerized to the activated carbon surface.

While we have shown and described several embodiments in accordance with our invention, it is to be clearly understood that the same may be susceptible to numerous changes apparent to one skilled in the art. Therefore, we do not wish to be limited to the details shown and described but intend to show all changes and modifications that come within the scope of the appended claims.

What is claimed is:

1. A carbonaceous material that has been loaded or preconditioned with at least one ionic organic species selected from the group consisting of: solid carbon carboxyl species, solid carbon hydroxyl species, solid carbon sulfonate species, solid carbon phenolic species, solid carbon lactone species, solid carbon amine species, solid carbon pyridenium species, cetylpyridinium, vinylbenzyltrimethylammonium, choline, and alkyl quaternary ammonium; and at least one metal, alkaline earth metal, or halide.

2. The carbonaceous material according to claim 1 wherein said metal or alkaline earth metal or halide is at least one selected from the group consisting of: iron, manganese, aluminum, copper, lead, zinc, calcium, and magnesium.

3. The carbonaceous material according to claim 1 wherein said metal or alkaline earth metal or halide is at least one selected from the group consisting of: sodium, potassium, lithium, rubidium, cesium, beryllium, magnesium, strontium, barium, radium, titanium, zirconium, vanadium, niobium, chromium, osmonium, cobalt, nickel, palladium, platinum, silver, gold, mercury, cadmium, boron, gallium, indium, silicon, tin, arsenic, lanthanides, actinides, chloride, bromide, and fluoride.

4. The carbonaceous material according to claim 1 wherein said carbonaceous material removes at least one oxyanion selected from the group consisting of arsenic oxyanions, chlorine oxyanions, phosphate oxyanions, nitrogen oxyanions, chrome oxyanions, fluorocarbon carboxyls, fluorocarbon sulfonates, and sulfur oxyanions.

5. The carbonaceous material according to claim 4 wherein said oxyanion contains a metal selected from the group consisting of aluminum, boron, osmium, gallium, rubidium, manganese, molybdimum, lead, tin, telluride, tungsten, and iron.

6. The carbonaceous material according to claim 1 wherein said ionic organic species preconditioning is achieved by exposing the carbonaceous material to an oxidizing agent.

7. The carbonaceous material according to claim 6 wherein said oxidizing agent is at least one selected from the group consisting of nitric acid, sulfuric acid, ozone, hydrogen peroxide, oxygen, gamma radiation, cobalt 60 radiation, *OH radicals, acetic anhydride, potassium permanganate, and hydrochloric acid.

8. The carbonaceous material according to claim 1, wherein said carbonaceous material is derived from at least one material selected from the group consisting of carbon aerogels, plastics, polymeric resins, bituminous coal, lignite coal, anthracite coal, coconut shells, wood, lignocellulosic material, peat, carbonaceous textiles, and chemical vapor deposits.

9. The carbonaceous material according to claim 1 wherein said halide is at least one selected from the group of: chloride, bromide, fluoride, and iodide.

10. The carbonaceous material according to claim 1, wherein the carbonaceous material exhibits a positive surface charge greater than about 0.09 milliequivalents/gram.

11. The carbonaceous material according to claim 1, wherein the ionic organic species is at least one selected from the group consisting of: quaternary ammonia, amines, imines, amides, imides, pyrrolic nitrogen, and pyridinic nitrogen.

* * * * *